(12) United States Patent
Rajagopalan

(10) Patent No.: US 6,203,451 B1
(45) Date of Patent: Mar. 20, 2001

(54) ZWITTER-ION AND IONENE GOLF BALL FORMING COMPOSITIONS AND METHODS

(75) Inventor: Murali Rajagopalan, South Dartmouth, MA (US)

(73) Assignee: Acushnet Company, Fairhaven, MA (US)

(*) Notice: Subject to any disclaimer, the term of this patent is extended or adjusted under 35 U.S.C. 154(b) by 0 days.

(21) Appl. No.: 09/226,098

(22) Filed: Jan. 13, 1999

(51) Int. Cl.$^7$ .............................. A63B 37/04; A63B 37/06

(52) U.S. Cl. .......................... 473/371; 473/356; 473/363; 473/365; 473/371; 473/372; 473/373; 473/374; 473/375; 473/376; 473/377; 473/378; 473/384; 473/385

(58) Field of Search ...................... 473/371–378, 473/385, 384, 359, 363, 365

(56) References Cited

U.S. PATENT DOCUMENTS

| | | | |
|---|---|---|---|
| 3,874,870 | 4/1975 | Green et al. ......................... 71/67 |
| 3,931,319 | 1/1976 | Green et al. ..................... 260/567.6 |
| 4,025,627 | 5/1977 | Green et al. ..................... 424/248.4 |
| 4,027,020 | 5/1977 | Green et al. .................... 424/248.56 |
| 4,046,750 | 9/1977 | Rembaum ......................... 526/310 |
| 4,217,914 | 8/1980 | Jacquet et al. ..................... 132/7 |
| 4,506,081 | 3/1985 | Fenyes et al. ..................... 548/523 |
| 4,515,882 | 5/1985 | Mammino et al. .................... 430/58 |
| 4,884,814 | 12/1989 | Sullivan .......................... 273/235 R |
| 5,120,791 | 6/1992 | Sullivan ........................... 525/196 |
| 5,324,783 | 6/1994 | Sullivan ........................... 525/196 |
| 5,360,840 | 11/1994 | Chan et al. ....................... 523/428 |
| 5,415,937 | 5/1995 | Cadorniga et al. ................. 428/407 |
| 5,492,972 | 2/1996 | Stefani ............................ 525/196 |
| 5,527,594 | 6/1996 | Kinoshita et al. ................. 428/212 |
| 5,569,100 | 10/1996 | Molitor et al. .................... 473/384 |
| 5,692,974 | 12/1997 | Wu et al. ......................... 473/377 |
| 5,833,552 | 11/1998 | Hamada et al. .................... 473/359 |
| 5,906,750 | 5/1999 | Haase ............................. 210/727 |
| 5,922,252 | * 7/1999 | Stanton ............................ 264/4 |
| 5,965,669 | * 10/1999 | Cavallaro ......................... 525/221 |
| 5,971,870 | 10/1999 | Sullivan et al. ................... 473/373 |
| 5,989,136 | * 11/1999 | Renard ............................ 473/376 |
| 6,001,930 | 12/1999 | Rajagopalan ...................... 525/92 B |
| 6,042,489 | * 3/2000 | Renard ............................ 473/374 |
| 6,056,650 | * 5/2000 | Yamagishi ........................ 473/384 |

FOREIGN PATENT DOCUMENTS 0 827 690 A2    3/1998   (EP).

OTHER PUBLICATIONS

Adi Eisenberg et al., "The Glass Transition of Aliphatic Ionenes", 1971, *Polymer Journal*, vol. 2, No. 2 pp 117–123.

Don H. Rasmussen et al., "The Glass Transition in Amorphous Water. Application of the Measurements to Problems Arising in Cryobiology", 1971, *The Journal of Physical Chemistry*, vol. 75, No. 78. pp 967–973.

Tetsuo Tsutsui et al., "Glass Transition in Aliphatic Ionenes", 1973, *Polymer Journal*, vol. 5, No. 3, pp 332–334.

(List continued on next page.)

Primary Examiner—Stephen F. Gerrity
Assistant Examiner—Paul Kim
(74) Attorney, Agent, or Firm—Pennie & Edmonds LLP

(57) ABSTRACT

The present invention provides golf balls having a cover, a core, and optionally one or more intermediate layers between the cover and the core, wherein at least one of the cover, the core and, if present, the intermediate layer(s), is formed of an ion-containing polymer composition, particularly a zwitter-ion or ionene polymer. The zwitter-ion polymers contain both cationic and anionic species on the polymer backbone or as a pendant group on the polymer backbone. The ionene polymers are contain only a cationic portion attached to the polymer backbone and are associated with another ion. These ion-containing polymer compositions can be used to provide improved characteristics to golf balls made therefrom. The invention also relates to methods of making and using the compositions in golf balls.

38 Claims, 1 Drawing Sheet

OTHER PUBLICATIONS

M.F. Hoover et al., "Recent Advances In Ion–Containing Polymers", 1974, *J. Polymer Sci: Symposium* No. 45, pp 1–37.

A. Eisenberg et al., "Ion–Containing Polymers", 1977, *Polymer Physics*, vol. 2, pp 180, 12–14, 60–63, 181–183, and 215–216.

Kirk K. S. Hwang et al., "Properties of Polyether–Polyether–Polyurethane Zwitterionomers", Oct. 1981, *Polymer Engineering and Science*, vol. 21, No. 15, pp. 1027–1035.

J. A. Miller et al., "Properties of Polyether–Polyurethane Anionomers", *J. Macromol. Sci.–Phys.*, Book 22 (2), pp 321–341, 1983.

Kirk K. S. Hwang et al., "Properties of Polyurethane Anionomers: Ionization via Bimolecular Nucleophilic Displacement of the Urethane Hydrogen", 1984, *J. Macromol. Sci.–Phys.*, pp 153–174.

T. A. Speckhard et al., "Properties of Segmented Polyurethane Zwitterionomer Elastomers", 1984, *J. Macromol. Sci. –Phys.*, pp 175–199.

R. A. M. Thomson, "Preparation of Ionic Polymers", 1986, *Developments in Ionic Polymers*, 2d., ed., pp 1–76.

X. Yu et al., "Poly(chloropropylmethyl–dimethylsiloxane)–Polyurethane Elastomers: Synthesis and Properties of Segmented Copolymers and Related Zwitterionomers", 1986, *Journal of Polymer Science*: Part B. Polymer Physics, vol. 24, pp 2681–2702.

T. Hamaide et al., "Polystyrene Zwitter Ionomers A Few Preliminary Results", 1987, *Structure and Properties of Ionomers*, pp. 529–533.

Salamone and Rice, "Polyampholytes," 1988, *Encyclopedia of Polymer Science and Engineering*, vol. 11, pp 514–530.

J. Salamone, "Ionomers", 1988, *Polymeric Materials Encyclopedia*, vol. 5, pp. 3435–3454.

A. C. Watterson et al., "Synthis and Solution Properties of Poly (Acrylamide/MPTMA.AMPS) Obtained by Different Preparation Methods", 1990, *Polym. Prep. Am. Chem. Soc.*, vol. 31. No. 1, pp 497–498.

Yu–Chu Yang et al., "A Comparison of the Oxidative Reactivites of Mustard (2,2'–Dichlorodiethyl Sulfide) and Bivalent Sulfides", 1990, *J. Org. Chem*, vol. 55, pp 3664–3666.

Erich E. Kathmann et al., "Copolymers of Sodium 2–Acrylamido–2–Methyl–Propanesulfonate with (2–Acrylamido–2–Methylpropyl) trimethylammonium Chloride", *Am. Chem. Soc., Div. Polym. Chem.*, vol. 32(1) pp 98–99, 1991.

R. Jerome et al., "Synthesis and Characterization of Molelcular Structure", 1997, Ionomers, Synthesis, Structure, Properties and Applications, 1997, Blackie Academic & Professional, pp. 1–40 and 197–203.

\* cited by examiner

ZWITTER-ION AND IONENE GOLF BALL FORMING COMPOSITIONS AND METHODS

FIELD OF THE INVENTION

The present invention relates to golf balls containing polymeric compositions that include at least one zwitter-ion or ionene polymer and methods for making and using the same.

BACKGROUND OF THE INVENTION

Three-piece, wound-core golf balls with balata (trans-polyisoprene) covers are typically preferred by professional and low handicap amateur golfers. These balls provide a combination of distance, high spin rate, and control that is not available with other types of golf balls. However, balata is easily damaged in normal play, and thus lacks the durability required by the average golfer.

Two-piece golf balls, which are typically used by the amateur golfers, provide a combination of durability and maximum distance that is not available with balata covered balls. These balls include a core, formed of a solid sphere which typically includes a polybutadiene-based compound, encased in an ionomer cover, such as SURLYN®. Golf ball cover ionomers are, typically, copolymers of an olefin and an unsaturated carboxylic acid in which at least a portion of the carboxylic acid groups have been neutralized with a metal ion, typically sodium or zinc. These balls are extremely durable, have good shear resistance, and are difficult to cut. However, this durability results from the hardness of the ionomer, which gives such balls a very hard "feel" when struck, which many golfers find inferior to the softer "feel" of a balata covered ball. In addition, the hardness of the ionomer gives the balls a lower spin rate, making these balls more difficult to control during short-distance hitting.

A basic discussion of conventional ionomers is found in the *Polymeric Materials Encyclopedia*, "Ionomers (Overview)," at pp. 3435–3454 (Ed. by J. Salamone, 1996). See also M. R. Tant, et al., Eds., "Ionomers," pp. 3–40 and 197–203 (1997). Generally speaking, ionomers have either a cationic or anionic group attached as a pendant group to the polymer backbone. Ionomers contain acidic groups, such as carboxylate or sulfonate, or basic groups, such as quaternary nitrogen, the acidic or basic groups being at least partially neutralized with a conjugate acid or base. Negatively charged acidic groups, such as carboxyl or sulfonate, may be associated with a cation, such as a metal ion. Positively charged basic groups, such as quaternary nitrogen, are generally associated with an anion, such as a halide, an acetate ion, or the like.

Many attempts have been made to produce a golf ball with the control and feel of a wound balata ball, and the durability of an ionomer covered two-piece ball. These attempts have focused largely on modifying the properties of ionomer compositions by forming ionomer blends. For example, U.S. Pat. Nos. 4,884,814, 5,120,791, 5,324,783, 5,415,937 and 5,492,972 disclose ball compositions that are blends of high-hardness ionomers and low-hardness ionomers.

U.S. Pat. No. 5,692,974 discloses compositions using cationic ionomer polymers having positively charged quaternary ammonium groups. The cationic groups, preferably present in cationic polyurethane polymers, impart improved characteristics to golf ball covers formed therefrom.

Other types of polymers, such as ionenes and zwitter-ion polymers, have been formulated and used in a variety of applications [See, e.g., K. Hwang et al., "Properties of Polyether-Polyurethane Zwitterionomers," *Polymer Engineering & Sci.*, 21(15): 1027–1035 (Oct. 1981). Synthesis of five- and six-membered cyclic sulfonium zwitter-ions, for example, is generally accomplished by reaction of a phenolic compound with tetrahydrothiophene-1-oxide and hydrogen chloride. The salts of hydrogen chloride are then prepared and reacted with an anion exchange resin such as DOWEX 1 in the hydroxyl form or sodium methoxide to form the zwitter-ion structure. [M. Hoover et al., "Recent Advances in Ion-Containing Polymers," *J. Polymer Sci.*, 45:1–37 (1974)].

Ampholytic polymers having a zwitter-ionic nature, for example, are known for use in soil conditioners, for recovery of minerals from aqueous suspensions, as flocculants, in shampoos, in hair conditioners, in paper fortifiers, in pigment-retention aids, as isoelectric focusing of proteins, as substitutes for proteins and gelatin substrates of photographic film. [J. Salamone et al., "Polyampholytes," *Encyclopedia of Polymer Science and Engineering*, Vol. 11, pp. 514–530 (2nd ed., 1988)]. Some of these ionenes and zwitter-ion polymers are described below.

U.S. Pat. Nos. 3,931,319 and 4,027,020 and EP 827,690 A2 disclose anti-microbial polymeric quaternary ammonium compounds (ionenes) having linear chains that randomly terminate in quaternary ammonium moieties, i.e., the ammonium is part of the polymeric chains rather than being appended thereto. Similarly, U.S. Pat. Nos. 3,874,870 and 4,025,627 disclose microbicidally active compounds including condensation products of 1,4-dihalo-2-butene with either difunctional tertiary amines of R'R"N-Z-N-R'R" or 1,4-bis-dimethylamino-2-butene, respectively, for use in cosmetic or aqueous compositions, respectively.

U.S. Pat. No. 4,046,750 discloses linear ionene polyquaternary cationic polymeric segments bonded by quaternization to biocompatible, small, porous particles containing halide or tertiary amine sites to which the segments attach. These particles, or beads, offer a positively-charged surface area for irreversibly binding polyanions, such as heparin, DNA, RNA, or bile acids, to remove them from solution or for reversibly binding monoanions, such as penicillin, pesticides, sex attractants, and the like for slow release.

U.S. Pat. No. 4,217,914 discloses a quaternized polymer for use as a hair or skin cosmetic agent, such as shampoo or lotion, having recurring units of RR'N$^+$X$^-$A-RR'N$^+$X$^-$B. Also disclosed are the use of such polymers for protecting hair and as pesticidal agents, flocculation agents, surfactants, and ion exchange agents.

U.S. Pat. No. 4,506,081 discloses novel polyquaternary ammonium compounds prepared from N,N'-bis(dialkylaminoalkyl)ureas, hydrochloric acid, epichlorohydrin, and tertiary amines for use as herbicides, corrosion inhibitors, debonding agents, flocculants, softeners, anti-static agents, and demulsifiers.

Despite the efforts noted above to produce improved golf balls, materials capable of providing improved properties, such as ionenes or zwitter-ion polymers, do not appear to be used in golf ball compositions. There is a need for new golf ball compositions capable of providing improved performance, such as an increased initial velocity, and having an improved feel during use thereof.

SUMMARY OF THE INVENTION

The present invention relates to a golf ball, which may be a one-piece ball but preferably including a cover and a core, wherein at least one of the cover and the core includes an ion-containing polymer composition having a flexural modulus of from about 500 psi to 300,000 psi, a hardness of at least about 15 Shore A, a loss tangent, also known as a dissipation factor, of less than about 1 at about 23° C., a specific gravity of at least about 0.7, and a dynamic shear storage modulus of at least about 10,000 dyn/cm² at about 23° C. and about 1 Hz, and wherein the composition includes at least one of an ionene or zwitter-ion polymer. The term "ion-containing polymer compositions" or "ion-containing polymer," as used herein, means a composition including ionene polymers, zwitter-ion polymers, or both.

The invention also relates to a golf ball including a center, at least one intermediate layer disposed about the center, and a cover disposed about the at least one intermediate layer, wherein at least one of the center, the at least one intermediate layer, and the cover includes an ion-containing polymer composition having a flexural modulus from about 500 psi to 300,000 psi, a hardness of at least about 15 Shore A, a loss tangent of less than about 1 at about 23° C., a specific gravity of at least about 0.7, and a dynamic shear storage modulus of at least about 10,000 dyn/cm² at about 23° C. and about 1 Hz, and which includes at least one of an ionene or zwitter-ion polymer. In this embodiment, the core includes both the center and the at least one intermediate layer.

In one embodiment, the ionene polymer of the ion-containing polymer composition includes a repeating unit of formula I:

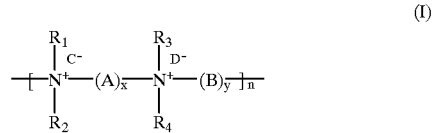

wherein $R_1$, $R_2$, $R_3$, and $R_4$ are each independently selected from hydrogen, alkyl, cycloalkyl, and aryl, A and B are independently selected from $C_{1-6}$alkyl, $C_{4-10}$cycloalkyl, or $C_{6-10}$aryl, C and D are independently selected from a halide, x and y are each independently selected from about 1 to 1,000, and n is from about 1 to 150,000. In another embodiment, the ion-containing polymer composition includes a random-, alternating-, or block-copolymer having repeating units of formula I. In a preferred embodiment, $R_1$, $R_2$, $R_3$, and $R_4$ are independently selected from hydrogen or a $C_{1-20}$alkyl. In a more preferred embodiment, each of $R_1$, $R_2$, $R_3$, and $R_4$ is hydrogen. In another embodiment, the ion-containing composition has a flexural modulus of from about 1,000 psi to 100,000 psi.

In another embodiment, the zwitter-ion polymer of the ion-containing polymer composition includes a repeating unit of formula II:

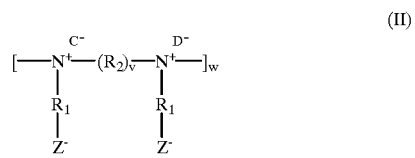

wherein Z is $CO_2$, $SO_3$, $PO_3$, or O, $R_1$ is a linear or branched, unsubstituted or substituted $C_{1-20}$, $R_2$ is an alkyl, cycloalkyl, or aryl, C and D are independently selected from a halide, and v and w are each independently chosen from 1 to about 1000. In another embodiment, the ion-containing polymer composition includes a random-, alternating-, or block-copolymer having repeating units of formula II. In a preferred embodiment, $R_1$ is a $C_{1-10}$alkyl and $R_2$ is an alkyl and v and w are each from 1 to 500. In a more preferred embodiment, $R_1$ is a $C_{1-6}$alkyl and $R_2$ is a $C_{1-20}$alkyl. In yet another embodiment, the ion-containing composition has a flexural modulus of from about 1,000 psi to 100,000 psi.

In another embodiment, at least one of the center, the at least one intermediate layer, and the cover further includes at least one additional polymer composition which is present in an amount of about 1 to 99 weight percent, based on the total weight of the composition. The ion-containing polymer and at least one additional polymer may be present in the same part of the ball (i.e., center, intermediate layer, or cover), in different portions of the ball, or both, i.e., together in one portion with only the ion-containing polymer or the at least one additional polymer present in a different portion of the ball. In a preferred embodiment, the additional polymer is present in an amount of about 5 to 80 weight percent of the total polymer. In one embodiment, the additional polymer includes a thermoset material, a thermoplastic material, or an ionomer.

In a preferred embodiment, the thermoset material includes at least one of a functionalized thermoset polymer, a thermoset copolymer or a functionalized thermoset copolymer, or a mixture thereof.

In another preferred embodiment, the ionomer includes at least one of a polyolefin, polyamide, polyester, poly (trimethylene terephthalate), copoly(ether-ester), copoly (ester-ester), polyamide, polyether, copoly(urethane-ester), copoly(urethane-ether), polyacrylate, polystyrene, styrene-butadiene-styrene copolymer, styrene-ethylene-butylene-styrene copolymer, polypropylene, ethylene-propylene-diene terpolymer or ethylene-propylene copolymer rubber, and a polycarbonate, or a homopolymer, copolymer, block copolymer, or a mixture thereof.

In another embodiment, at least a portion of at least one of the center, the at least one intermediate layer and the cover is foamed, includes a density-modifying filler, or both. In yet another embodiment, at least a portion of the center includes a fluid or a hollow portion. In yet another embodiment, the at least one intermediate layer includes a tensioned elastomeric material.

BRIEF DESCRIPTION OF THE DRAWINGS

Further features and advantages of the invention can be ascertained from the following detailed description that is provided in connection with the drawing described below.

DETAILED DESCRIPTION OF THE INVENTION

Figure 1:
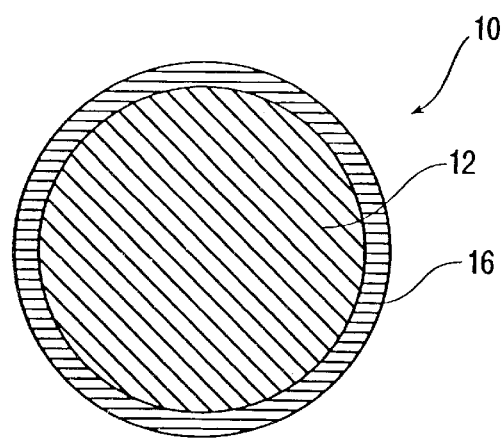
FIG. 1 is a cross-sectional view of a two-piece golf ball according to the invention having a cover and a core.

Accordingly, golf ball forming compositions including ion-containing polymer compositions have now been found to produce golf balls having improved characteristics. These ion-containing polymer compositions include ionene polymers, zwitter-ion polymers, or a combination of the two polymers. These improved materials advantageously provide, in part, improved durability and resiliency to golf ball formulations.

Ionene polymers useful in forming ion-containing polymer compositions for use in the invention include repeating units of formula I:

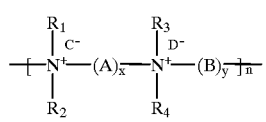

(I)

wherein $N^+$ indicates a site for ionic bonding with a negatively charged ion.

$R_1$, $R_2$, $R_3$, and $R_4$ are each independently selected from hydrogen or a linear or branched, substituted or unsubstituted $C_{1-20}$ compounds. $R_1$, $R_2$, $R_3$, and $R_4$ are preferably independently selected from a $C_{1-10}$alkyl, more preferably from a $C_{1-6}$alkyl.

A and B are each independently selected from a linear or branched, substituted or unsubstituted $C_{1-6}$alkyl, $C_{4-10}$cycloalkyl, or $C_{6-10}$aryl. x and y are each independently from about 1 to 1,000, preferably from about 1 to 500, more preferably from about 1 to 200. n is from about 1 to 150,000, preferably from about 1 to 10,000.

Ion-containing polymers useful in the present invention include any homopolymer, copolymer, or terpolymer, which includes including repeating units of formula I. An example includes ω-haloalkyl dialkylamines. Other suitable ionene polymers are described in U.S. Pat. Nos. 3,874,870, 3,931,319, 4,025,627, 4,027,020, 4,506,081, and 4,217,914, the disclosures of which are incorporated herein by express reference thereto.

Zwitter-ion polymers that have been found useful in forming ion-containing golf ball forming polymer compositions of the invention include repeating units of formula II below:

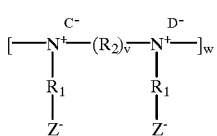

(II)

wherein Z is $CO_2$, $SO_3$, $PO_3$, or O, $R_1$ is a linear or branched, unsubstituted or substituted $C_{1-20}$ compounds, preferably $C_{1-10}$alkyl, and more preferably $C_{1-6}$alkyl; and $R_2$ is an alkyl, cycloalkyl, or aryl, and v and w are each independently chosen from 1 to about 1000, preferably 1 to 500, more preferably 1 to 250. The ion-containing polymers useful in the present invention include any homopolymer, copolymer, or terpolymer including repeating units of the zwitter-ion polymer of formula II.

A metal cation "$M^+$" may also be associated with the $Z^-$ ion. Preferably, the ionic groups are present in from about 10 to 50 mol percent of the composition, more preferably from about 20 to 40 mol percent. The metal ion can be any metal ion which forms an ionic compound with the zwitter-ion polymer. The metal is thus not particularly limited, and includes any Group IA, IIA, IIIB, IVB, VB, VIB, VIIB, VIIIB, IB, IIB, IIIA, and IVA metals. Preferred are alkali metals, more preferably lithium, sodium, or potassium; alkaline earth metals, more preferably calcium or magnesium; transition metals, more preferably zinc, tungsten, titanium, zirconium, copper, or manganese, and Group IIIA and IVA metals, more preferably aluminum and tin. The metal ion can have a +1 to +6 charge, preferably a +1 to +4 charge. Most preferably, the metal is sodium, potassium or zinc.

The ion-containing polymer composition can also be a copolymer formed from two or more monomers having different substituents. For example, a copolymer formed from two different ionene monomers, from two different zwitter-ion monomers, or from an ionene monomer and a zwitter-ion monomer, may be used in a golf ball. When a copolymer is present, the polymer composition can be a random copolymer, an alternating copolymer, or a block copolymer. The term "copolymer" as used herein includes terpolymers.

Any suitable zwitter-ion containing polymer may be used in the ion-containing polymer compositions of the present invention. For example, polyurethanes, sulfobetaines, polystyrenes, aryl cyclic sulfoniums, and the like, are suitable classes of zwitter-ion polymer compositions for use in the ion-containing composition. Sulfobetaines include: 1-vinyl-3-(3-sulfopropyl)imidazolium hydroxide inner salt, 1-vinyl-2-methyl-3-(3-sulfopropyl)imidazolium hydroxide inner salt, 1-vinyl-3-(4-sulfobutyl)imidazolium hydroxide inner salt, 1-vinyl-2-methyl-3-(4-sulfobutyl)imidazolium hydroxide inner salt, 1-vinyl-3-(2-sulfobenzyl)imidazolium hydroxide inner salt, 2-vinyl-1-(3-sulfopropyl)pyridinium hydroxide inner salt, 2-methyl-5-vinyl-1-(3-sulfopropyl) pyridinium hydroxide inner salt, 4-vinyl-1-(3-sulfopropyl) pyridinium hydroxide inner salt, dimethyl-(2-methacryloxyethyl)(3-sulfopropyl)ammonium hydroxide inner salt, dimethyl-(2-methacryloxyethoxy-2-ethyl)(3-sulfopropyl)ammonium hydroxide inner salt, 4-vinyl-4-(sulfobutyl)pyridinium hydroxide inner salt, N-(3-sulfopropyl)-N-methacrylamidopropyl-N,N-dimethylammonium betaine, N-(3-carboxypropyl)-N-methacrylamido-ethyl-N,N-dimethylammonium betaine, 4-vinylpiperdinium ethanecarboxy-betaine, 4-vinylpyridinium methanecarboxy-betaine, and the like.

Blends of two or more ion-containing polymer compositions are also included within the scope of the present invention. For example, ionene/ionene blends, zwitter-ion/zwitter-ion blends, and ionene/zwitter-ion blends are all envisioned for use in the golf ball forming compositions of the present invention. Although the component polymers of these blends are usually physically blended without chemical reaction, compositions within the scope of the invention should be understood to include reaction products of blended polymer compositions.

Other conventional materials or polymers may also be used in admixture, or in conjunction, with the ionene(s) and/or zwitter-ion(s) described herein for forming golf balls according to the present invention, such as a combination with one or more thermoplastic or thermoset materials. Thus, in one embodiment, the ion-containing polymer compositions of the present invention can include compatible blends of at least one ion-containing polymer as described above and one or more additional polymers or other materials. Such blends can be formed using blending methods well known in the art. Thus, the term "blends," as used herein, means a combination or reaction product of at least one ion-containing polymer composition and at least one additional polymer or other material that may be mixed, combined, or reacted to modify or improve the golf ball compositions. In another embodiment, ion-containing polymers or a blend thereof may be used in one or more portions of the ball and other types of polymers may be used to form one or more different portions of the ball. For example, the ion-containing polymer may be present in the cover layer(s) and a thermoset, thermoplastic, or both may be present in the core. As another example, the ion-containing polymer may be present in one or more intermediate layers between the center and cover and the cover can be other types of polymers, such as a thermoset, thermoplastic, or both.

Among the conventional materials that may be used in forming blends are thermoplastic materials that include one or more of an ionomer of a polyolefin, polyamide, polyester, poly(trimethylene terephthalate), copoly(ether-ester), copoly(ester-ester), polyamide, polyether, copoly(urethane-ester), copoly(urethane-ether), polyacrylate, polystyrene, styrene-butadiene-styrene copolymer, styrene-ethylene-butylene-styrene copolymer, polypropylene, ethylene-propylene-diene terpolymer or ethylene-propylene copolymer rubber, where the rubber is dynamically vulcanized, as well as polycarbonate homopolymer, copolymer, and block copolymer ionomers, mixtures thereof, and the like. Preferably, ionomers useful in the invention are copolymers of an olefin and an α,β-ethylenically unsaturated carboxylic acid, where at least a portion of the carboxylic acid groups are associated with a metal ion. More preferably, the olefin is ethylene, and the α,β-ethylenically unsaturated carboxylic acid is acrylic or methacrylic acid, where the metal ion is zinc, sodium, magnesium, manganese, calcium, lithium or potassium. As used herein, the terms "ionomer," "ionomer resin," and "thermoplastic ionomer" are synonymous.

Other suitable thermoplastic materials that are not ionomers (also referred to herein as "non-ionomeric thermoplastic materials") include functionalized polymers, copolymers, and functionalized copolymers, and mixtures thereof, including: polyamide; polycarbonate; poly(phenylene oxide); imidized, amino group containing polymers; high impact polystyrene (hereafter HIPS); polysulfone; poly (phenylene sulfide); reinforced engineering plastics; poly-tetrafluoroethylene; non-ionic olefinic homopolymers and copolymers, such as those produced by using free radical, ionic, Ziegler-Natta or metallocene catalysts, including but not limited to a polymer comprising an α-olefin containing from 2 to 10 carbon atoms, poly(ethylethylene), poly (heptylethylene), poly(hexyldecylethylene), poly (isopentylethylene), poly(ethylene-propylene), poly (ethylene-butene), poly(ethylene-vinyl acetate) and poly (ethylene-vinyl alcohol); poly(butyl acrylate); poly(2-ethylbutyl acrylate); poly(heptyl acrylate); poly(2-methylbutyl acrylate); poly(3-methylbutyl acrylate); poly (N-octadecylacrylamide); poly(octadecyl methacrylate); polybutoxyethylene; polymethoxyethylene; polypentyloxyethylene; poly(1,1-dichloroethylene); poly (oxyethylethylene); poly(oxytrimethylene); polysilazane; poly(furan tetracarboxylic acid diimide); polyacrylonitrile; poly(α-methylstyrene); poly(acrylonitrile-butadiene); poly (ethylene terephthalate); poly(butylene terephthalate); poly (vinyl alcohol); poly(vinyl acetate); polysilane; poly (siloxane); poly(vinylidene fluoride); poly(methyl acrylate); poly(methyl methacrylate); acrylonitrile-butadiene-styrene copolymer (hereafter ABS); poly(urethane); poly(urea); block copolymer of poly(ether-ester) copolymers, such as HYTREL® available from DuPont; partially or fully hydrogenated styrene-butadiene-styrene block copolymers, such as the KRATON D® grades available from Shell Chemical; styrene-(ethylene-propylene)-styrene or styrene-ethylene-butylene-styrene block copolymers, such as the KRATON G® series from Shell Chemical; Septon HG-252 from Kurary; either of the KRATON®-type copolymers with maleic anhydride or sulfonic graft or hydroxyl functionality, such as the KRATON FD® or KRATON FG® series available from Shell Chemical; olefinic copolymers, such as the ethylene-methyl acrylate or ethylene-butyl acrylate series available from Quantum Chemical; ethylene-octene copolymers made with metallocene catalysts, such as the AFFINITY® and ENGAGE® series available from Dow; ethylene-alpha olefin copolymers and terpolymers made from metallocene catalysts, such as the EXACT® series available from Exxon; block copolymer of poly(urethane-ester) or block copolymer of poly(urethane-ether) or block copolymer of poly(urethane-caprolactone); polyethylene glycol, such as CARBOWAX® available from Union Carbide; polycaprolactone; polycaprolactam; polyesters, such as EKTAR® available from Eastman; and ethylene-propylene-(diene monomer) terpolymers and their sulfonated or carboxylated derivatives, and SANTOPRENE® from Monsanto. Preferably, the non-ionomer thermoplastic elastomer polymer is selected from the group consisting of a block copolymer of copoly(ester-ester), a block copolymer of copoly(ester-ether), a block copolymer of copoly(urethane-ester), a block copolymer of copoly(urethane-ether), a block polystyrene thermoplastic elastomer of an unsaturated rubber, a block polystyrene thermoplastic elastomer of a functionalized substantially saturated rubber, a thermoplastic and elastomer blend including polypropylene and ethylene-propylene-diene terpolymer or ethylene-propylene copolymer rubber where the rubber is dynamically vulcanized.

Thermoset materials include a functionalized thermoset polymer, a thermoset copolymer or a functionalized thermoset copolymer, or mixtures thereof, including: poly (isoprene), both natural and synthetic; poly(butadiene); poly (chloroprene); poly(urethane); poly(siloxane); styrene-butadiene-styrene rubber; ethylene-propylene-diene rubber; nitrile rubber; butyl rubber; chlorotrifluoroethylene copolymer rubber; vinylidene fluoride-hexafluoropropylene copolymer rubber; polysulfide rubber; epichlorohydrin rubber; poly(urea); poly(ester); phenolic resin; epoxy resin; and any other crosslinkable thermoplastic polymer; and the like.

The ion-containing polymer compositions of the present invention have a flexural modulus of from about 500 psi to 300,000 psi, preferably from about 1000 to 100,000 psi. The ion-containing polymer compositions also typically have a hardness of at least about 15 Shore A, preferably from about 30 Shore A to 80 Shore D, and more preferably from about 50 Shore A to 60 Shore D. The polymer compositions also have a dynamic shear storage modulus, as defined by ASTM D4092–90, D4065–94, and 5279-93 at room temperature (typically about 23° C.) and at a frequency of about 1 Hz, of at least about 10,000 dyn/cm$^2$, preferably from about $10^4$ to $10^{10}$ dyn/cm$^2$, more preferably from about $10^6$ to $10^{10}$ dyn/cm$^2$. The specific gravity of the polymer compositions is at least about 0.7, preferably at least about 0.9. The loss tangent of the polymer compositions is less than about 1 at 23° C., preferably less than about 0.01, and more preferably less than about 0.001. The loss tangent is a ratio of the loss modulus over the dynamic shear storage modulus.

When the ion-containing polymer composition(s) are combined with at least one additional polymer component to form a blend, the additional polymer component is present in an amount of about 1 to 99 weight percent, preferably about 5 to 80 weight percent, based on the total weight of the ion-containing polymer(s) and the additional polymer(s).

Additional materials may also be added to the ion-containing polymer composition of the invention, such as coloring agents, reaction enhancers, crosslinking agents, dyes, lubricants, fillers (including density modifying fillers), nano- or microspheres, blowing agents, process aids, and other conventional compounds commonly added to polymeric materials and/or golf ball compositions to aid in processing the compositions or to obtain the desired properties in the golf ball composition.

The ion-containing polymer compositions, e.g., ionenes or zwitter-ion polymers, can be present in any one or more layers of the golf ball, such as the cover or a portion thereof or the core or a portion thereof. For example, the ion-containing polymer compositions may be present in at least an outer portion of the core, i.e., an intermediate or mantle layer.

Figure 2:
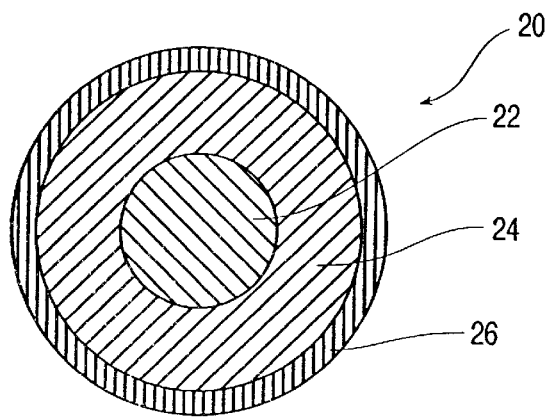
FIG. 2 is a cross-section of a golf ball according to the invention having an intermediate layer between a cover and a core.
Figure 3:
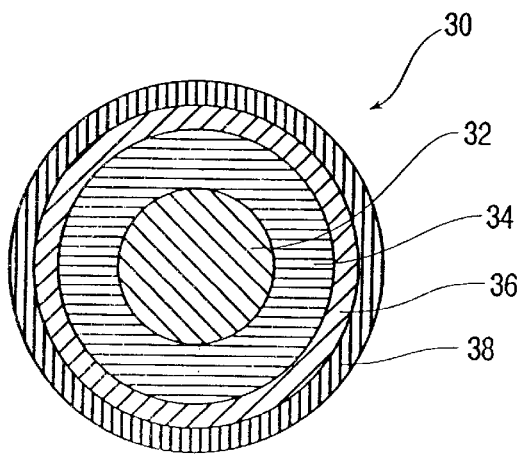
FIG. 3 is a cross-section of a golf ball according to the invention having more than one intermediate layer between a cover and a core.

In particular, as shown in the attached drawing FIG. 1, two-piece golf balls 10 having a cover 16 surrounding a core 12 are within the scope of the invention, wherein the cover 16, the core 12, or both the cover 16 and the core 12 include the ion-containing polymer compositions described herein. Further, wound golf balls having a fluid, hollow, semi-solid, or solid core surrounded by an elastic synthetic material are also contemplated for use in the present invention. The ion-containing polymer compositions can also be used in a three-piece golf ball having a cover 26, intermediate layer 24, and center 22, as illustrated in FIG. 2. In one embodiment, the intermediate layer 24 is an outer core layer, such that the core is formed from the center 22 and the intermediate layer 24 and the ball has a single layer cover 26. In another embodiment, the intermediate layer 24 is an inner cover layer, such that the cover is formed from the intermediate layer 24 and the cover 26 and the ball has a core formed of center 22. Each of the cover, the core, and the optional intermediate layer(s) may also comprise more than one layer, i.e., the golf ball can be a conventional three-piece wound ball, a two-piece ball, a ball having a multi-layer core and/or a mantle layer or layers, etc. Thus, referring to FIG. 3, a golf ball 30 of the present invention can comprise a core 32, a cover 38, and intermediate layers 34 and 36 disposed between the cover and the core. Although FIG. 3 shows only two intermediate layers, it will be appreciated that any number of core, intermediate, or cover layers may be used, as desired. The compositions may be used in any one or more of such cover, core and intermediate layers. Preferably, at least the cover comprises an ion-containing polymer composition.

Any part of the golf ball composition of the invention can be formulated as a blend with any suitable composition known for use in golf balls. Suitable compositions for the manufacture of golf ball compositions are well known to those of ordinary skill in the art. In a situation where the core contains an ion-containing polymer composition, for example, the cover, or any part thereof, may include any golf ball compositions known in the art. Thus, a cover that does not contain the ion-containing polymer composition may contain one or more conventional ionomers, natural or synthetic balata, or any other conventional cover material. Similarly, a core or intermediate layer might include polybutadiene or another suitable elastomeric composition, whether or not the ion-containing polymer composition is present. Moreover, at least a portion of at least one of the core, the at least one intermediate layer and the cover may be foamed with blowing agents as noted herein. At least a portion of at least one of the core, the at least one intermediate layer and the cover may include a density-modifying filler. When a fluid-filled ball is desired, at least a portion of the core may be a fluid. The fluid may be, for example, a gas or a liquid, with a liquid being preferred. In another embodiment, a portion of the core may be hollow. If a wound ball is desired, the at least one intermediate layer may include a tensioned elastomeric material.

The resultant golf balls typically have a coefficient of restitution of greater than about 0.7, preferably greater than about 0.75, and more preferably greater than about 0.78. The coefficient of restitution is measured using a 125 ft/s initial velocity according to the ASTM standards discussed herein. The golf balls also typically have a compression of at least about 40, preferably from about 50 to 120, and more preferably from about 60 to 100. As used herein, the term "compression" means as measured by an ATTI Compression Gauge. These gauges are well known to those of ordinary skill in the art and are commercially available from Atti Engineering Corp. of Union City, N.J.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred. The cover of the golf balls typically has a thickness of at least about 0.03 inches, preferably 0.03 to 0.125 inches, and more preferably from about 0.05 to 0.1 inches. The golf balls also typically have at least about 60 percent dimple coverage, preferably at least about 70 percent dimple coverage, of the surface area.

One or more layers including the ion-containing polymer compositions may be produced by any suitable method available to those of ordinary skill in the art, such as by injection molding or compression molding a layer of ion-containing polymer material about a previously formed center or core, cover, or intermediate layer. Cores including an ion-containing polymer composition may also be formed directly by injection molding or compression molding. When a layer or the core is injection molded, a physical or chemical blowing or foaming agent may be included to produce a foamed layer. These blowing or foaming agents may be readily selected by one of ordinary skill in the art.

For compression molded layers, half-shells made by injection molding an ion-containing polymer composition in a conventional half-shell mold or by compression molding commercially available sheets of ion-containing polymer compositions are used. The half-shells are placed about a previously formed center or core, cover, or optional mantle layer, and the assembly is introduced into a compression molding machine and compression molded at about 250° F. to 400° F. using conventional compression molding techniques well known to those of ordinary skill in the art. The molded balls are then cooled while still in the mold, and finally removed when the layer is hard enough to be handled without deforming. Additional core, intermediate, and cover layers are then disposed onto the previously molded layers, as needed, until a complete ball is formed.

After the final cover layer of the ball has been molded, the ball may be subjected to one or more conventional finishing operations, such as buffing, painting, and stampings, all of which are well known in the art. Any suitable finishing operation may be conducted, however.

Blending of the ion-containing polymer compositions and the optional additional polymers may be accomplished in a conventional manner using conventional equipment. The injection molding machine is used either to make preformed half-shells for compression molding or for molding flowable ion-containing polymer compositions using a retractable-pin mold.

The term "about," as used herein in connection with one or more numbers or numerical ranges, should be understood to refer to all such numbers, including all numbers in a range.

EXAMPLES

The following examples are provided only for the purpose of illustrating the invention and are not to be construed as limiting the invention in any manner.

Example 1

Synthesis of a Zwitter-Ion Ion-Containing Composition

Polyurethane zwitter-ionomers may be prepared by using N-methyl diethanolamine (MDEA) as a chain extender in preparing the base polyurethane from an isocyante and polyol. The MDEA permits ionization of the polyurethane to proceed readily via quaternization of the tertiary amine in the chain extender. Zwitterionomers are then produced by dissolving the MDEA chain-extended polyurethane in N,N-dimethylacetamide (DMA) and adding a suitable amount of γ-propane sultone. The sultone undergoes a ring opening reaction resulting in the formation of a quaternary ammonium ion closely linked to a sulfonyl anion, i.e., a zwitter-ion pair. A suitable scheme for such synthesis is as follows:

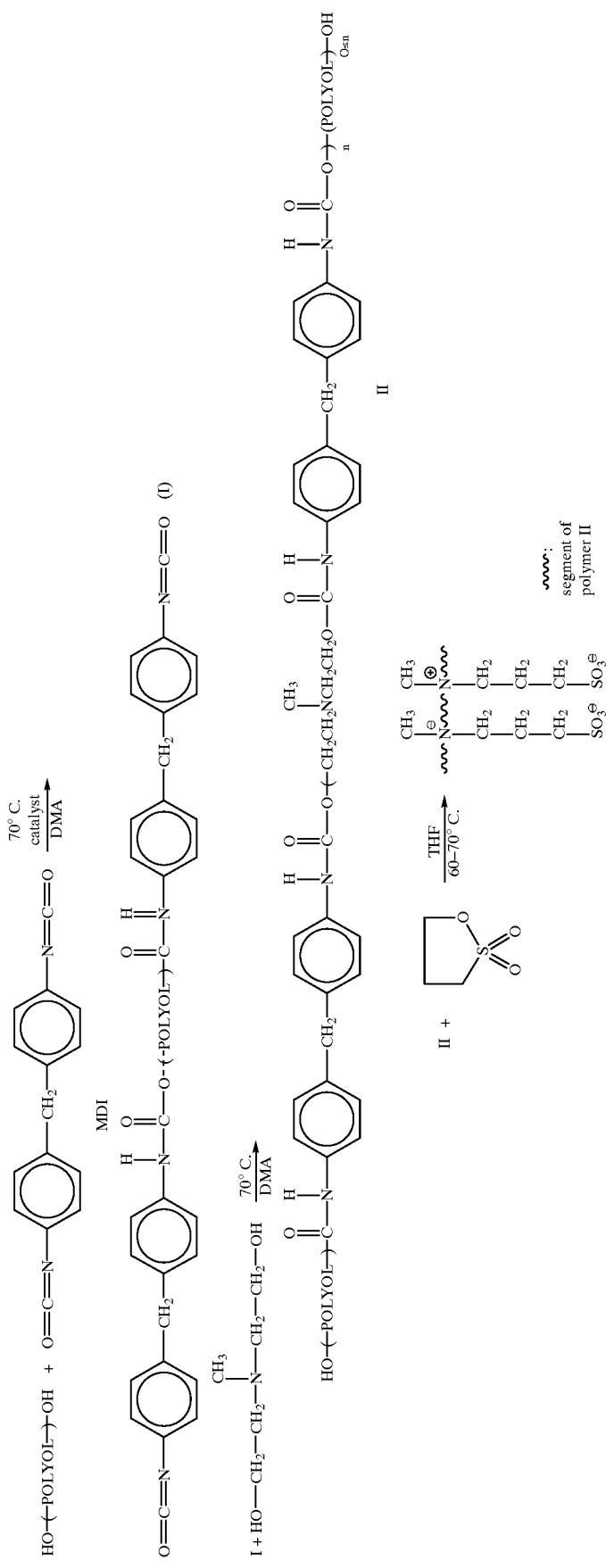

Example 2

Synthesis of Sulfobetaine Zwitter-Ion Ion-Containing Composition

A 1-vinylimidazole and 1,3-propanesultone may be reacted to obtain a 1-vinyl-3-(3-sulfopropyl)imidazolium hydroxide inner salt as follows:

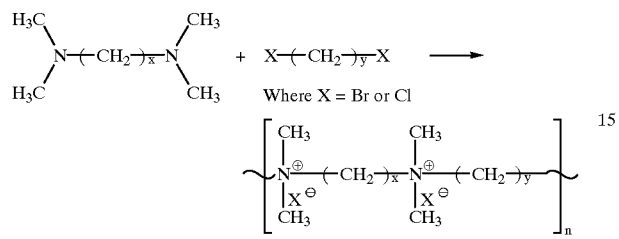

Example 3

Synthesis of X,Y-Ionene Ion-Containing Composition

A di-tertiary amine may be reacted with a dihalide to form a linear unsymmetrical polyquaternary ammonium compound as shown below:

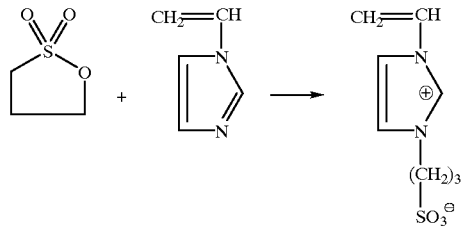

[M. Hoover et al., "Recent Advances in Ion-Containing Polymers," J. Polymer Sci., 45:1–37 (1974)].

Example 4

Synthesis of Carboxylato-Betaine Modified Polystyrene Zwitter-Ion

Carboxylato-betaine polystyrene zwitter-ion polymers may be prepared for use in the compositions of the present invention by the following synthesis:

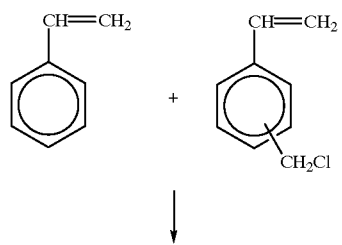

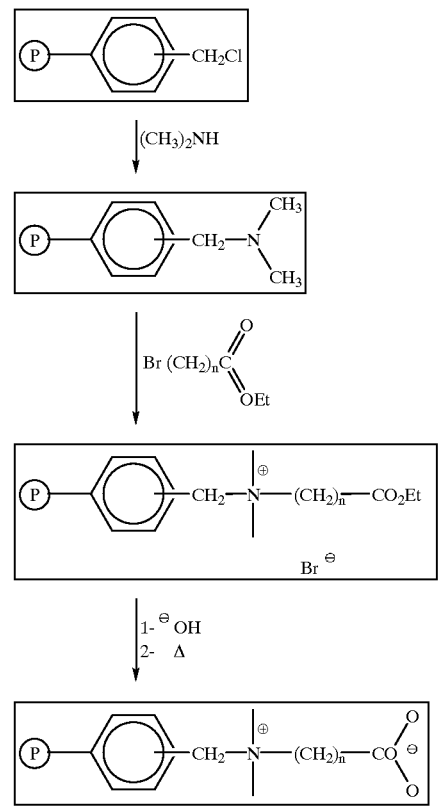

It is to be recognized and understood that the invention is not to be limited to the exact configuration as illustrated and described herein. For example, it should be apparent that a variety of suitable materials may be used in the composition or method of making the golf balls according to the Detailed Description of the Invention. Accordingly, all expedient modifications readily attainable by one of ordinary skill in the art from the disclosure set forth herein are intended to be within the spirit and scope of the present claims.

What is claimed is:

1. A golf ball having a coefficient of restitution of greater than about 0.7 and a compression of at least about 50 comprising a core and a cover disposed concentrically about the core with the cover having a thickness of at least about 0.03 inches and at least about 60 percent dimple coverage, wherein at least one of the cover and the core is formed of an ion-containing polymer composition comprising at least one of an ionene or a zwitter-ion polymer, wherein the ion-containing polymer composition has a flexural modulus from about 500 psi to 300,000 psi, a hardness of at least about 15 Shore A, a loss tangent of less than about 1 at about 23° C., a specific gravity of at least about 0.7, and a dynamic shear storage modulus of at least about 10,000 dyn/cm$^2$ at about 23° C. and about 1 Hz.

2. The golf ball of claim 1, wherein the ionene composition comprises at least one unit of formula I:

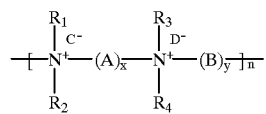

(I)

wherein $R_1$, $R_2$, $R_3$, and $R_4$ are each independently selected from hydrogen, alkyl, cycloalkyl, and aryl, A and B are each independently selected from $C_{1-6}$alkyl, $C_{4-10}$cycloalkyl, and $C_{6-10}$aryl, C and D are each independently selected from a halide, x and y are each independently from about 1 to 1,000, and wherein n is from about 1 to 150,000.

3. The golf ball of claim 2, wherein the ionene composition comprises a random-, alternating-, or block-copolymer including the unit of formula I.

4. The golf ball of claim 1, wherein $R_1$, $R_2$, $R_3$, and $R_4$ are independently selected from hydrogen or a $C_{1-20}$alkyl.

5. The golf ball of claim 4, wherein each of $R_1$, $R_2$, $R_3$, and $R_4$ is hydrogen.

6. The golf ball of claim 1, wherein the ionene composition has a flexural modulus of from about 1,000 psi to 100,000 psi.

7. The golf ball of claim 1 wherein the zwitter-ion composition comprises at least one unit of formula II:

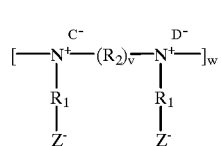

(II)

wherein Z is $CO_2$, $SO_3$, $PO_3$, or O, $R_1$ is a linear or branched, unsubstituted or substituted $C_{1-20}$ compound, $R_2$ is an alkyl, cycloalkyl, or aryl, C and D are each independently selected from a halide, and v and w are each independently from 1 to about 1000.

8. The golf ball of claim 7, wherein the zwitter-ion composition comprises a random-, alternating-, or block-copolymer including the unit of formula II.

9. The golf ball of claim 7, wherein $R_1$ is a $C_{1-10}$alkyl and $R_2$ is an alkyl and v and w are each from 1 to 500.

10. The golf ball of claim 9, wherein $R_1$ is a $C_{1-6}$alkyl and $R_2$ is a $C_{1-20}$alkyl.

11. The golf ball of claim 7, wherein the zwitter-ion composition has a flexural modulus of from about 1,000 psi to 100,000 psi.

12. The golf ball of claim 7, wherein the additional polymer is present in an amount of about 5 to 80 weight percent.

13. The golf ball of claim 1, wherein at least one of the core and the cover further comprises at least one additional polymer composition present in an amount of about 1 to 99 weight percent, based on the total weight of the composition.

14. The golf ball of claim 13, wherein the additional polymer comprises a thermoset material, a thermoplastic material, or an ionomer.

15. The golf ball of claim 14, wherein the thermoset material comprises at least one of a functionalized thermoset polymer, a thermoset copolymer or a functionalized thermoset copolymer, or a mixture thereof.

16. The golf ball of claim 14, wherein the ionomer comprises at least one of a polyolefin, polyamide, polyester, poly(trimethylene terephthalate), copoly(ether-ester), copoly(ester-ester), polyamide, polyether, copoly(urethane-ester), copoly(urethane-ether), polyacrylate, polystyrene, styrene-butadiene-styrene copolymer, styrene-ethylene-butylene-styrene copolymer, polypropylene, ethylene-propylene-diene terpolymer or ethylene-propylene copolymer rubber, and a polycarbonate, or a homopolymer, copolymer, block copolymer, or a mixture thereof.

17. The golf ball of claim 1, wherein at least a portion of at least one of the core, the at least one intermediate layer and the cover is foamed, comprises a density-modifying filler, or both.

18. The golf ball of claim 1, wherein at least a portion of the core comprises a fluid or a hollow portion.

19. The golf ball of claim 1, wherein the at least one intermediate layer comprises a tensioned elastomeric material.

20. A golf ball having a coefficient of restitution of greater than about 0.7 and a compression of at least about 50 comprising a center, at least one intermediate layer disposed about the center, and a cover disposed about the at least one intermediate layer with the cover having a thickness of at least about 0.03 inches and at least about 60 percent dimple coverage, wherein at least one of the center, the at least one intermediate layer, or the cover includes an ion-containing polymer composition comprising at least one of an ionene or zwitter-ion polymer which has a flexural modulus of from about 500 psi to 300,000 psi, a hardness of at least about 15 Shore A, a loss tangent of less than about 1 at about 23° C., a specific gravity of at least about 0.7, and a dynamic shear storage modulus of at least about 10,000 $dyn/cm^2$ at about 23° C. and about 1 Hz.

21. The golf ball of claim 20, wherein the ionene composition comprises at least one unit of formula I:

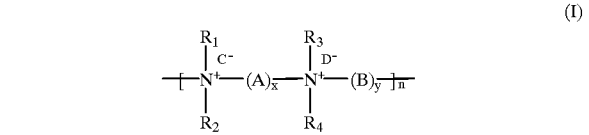

(I)

wherein $R_1$, $R_2$, $R_3$, and $R_4$ are each independently selected from hydrogen, alkyl, cycloalkyl, and aryl, C and D are each independently selected from a halide, A and B are each independently selected from $C_{1-6}$alkyl, $C_{4-10}$cycloalkyl, or $C_{6-10}$aryl, x and y are each independently from about 1 to 1,000, and wherein n is from about 1 to 150,000.

22. The golf ball of claim 21, wherein the ionene composition comprises a random-, alternating-, or block-copolymer including the unit of formula I.

23. The golf ball of claim 21, wherein $R_1$, $R_2$, $R_3$, and $R_4$ are independently selected from hydrogen or a $C_{1-20}$ compound.

24. The golf ball of claim 23, wherein each of $R_1$, $R_2$, $R_3$, and $R_4$ is hydrogen.

25. The golf ball of claim 21, wherein the ionene polymer composition has a flexural modulus of from about 1,000 psi to 100,000 psi.

26. The golf ball of claim 20, wherein the zwitter-ion composition comprises at least one unit of formula II:

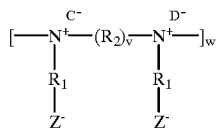
(II)

wherein Z is $CO_2$, $SO_3$, $PO_3$, or O, $R_1$ is a linear or branched, unsubstituted or substituted $C_{1-20}$alkyl, $R_2$ is an alkyl, cycloalkyl, or aryl, C and D are each independently selected from a halide, and wherein v and w are each independently from 1 to about 1000.

27. The golf ball of claim 26, wherein the zwitter-ion composition comprises a random-, alternating-, or block-copolymer including the unit of formula II.

28. The golf ball of claim 26, wherein $R_1$ is a $C_{1-10}$alkyl and $R_2$ is an alkyl and wherein v and w are each from 1 to 500.

29. The golf ball of claim 28, wherein $R_1$ is a $C_{1-6}$alkyl and $R_2$ is a $C_{1-20}$alkyl.

30. The golf ball of claim 26, wherein the zwitter-ion polymer composition has a flexural modulus of from about 1,000 psi to 100,000 psi.

31. The golf ball of claim 20, wherein at least one of the center, the at least one intermediate layer, and the cover further comprises at least one additional polymer composition present in an amount of about 1 to 99 weight percent, based on the total weight of the composition.

32. The golf ball of claim 31, wherein the additional polymer is present in an amount of about 5 to 80 weight percent.

33. The golf ball of claim 32, wherein the additional polymer comprises at least one of a thermoset material, a thermoplastic material, or an ionomer.

34. The golf ball of claim 33, wherein the thermoset material comprises at least one of a functionalized thermoset polymer, a thermoset copolymer or a functionalized thermoset copolymer, or a mixture thereof.

35. The golf ball of claim 33, wherein the ionomer comprises at least one of a polyolefin, polyamide, polyester, poly(trimethylene terephthalate), copoly(ether-ester), copoly(ester-ester), polyamide, polyether, copoly(urethane-ester), copoly(urethane-ether), polyacrylate, polystyrene, styrene-butadiene-styrene copolymer, styrene-ethylene-butylene-styrene copolymer, polypropylene, ethylene-propylene-diene terpolymer or ethylene-propylene copolymer rubber, and a polycarbonate, or a homopolymer, copolymer, block copolymer, or a mixture thereof.

36. The golf ball of claim 20, wherein at least a portion of at least one of the center, the at least one intermediate layer and the cover is foamed, comprises a density-modifying filler, or both.

37. The golf ball of claim 20, wherein at least a portion of the center comprises a fluid or a hollow portion.

38. The golf ball of claim 20, wherein the at least one intermediate layer comprises a tensioned elastomeric material.

* * * * *